Nov. 5, 1940.    F. R. ERBACH    2,220,814
SEALING DEVICE FOR ROTATING SHAFTS
Filed Nov. 8, 1937
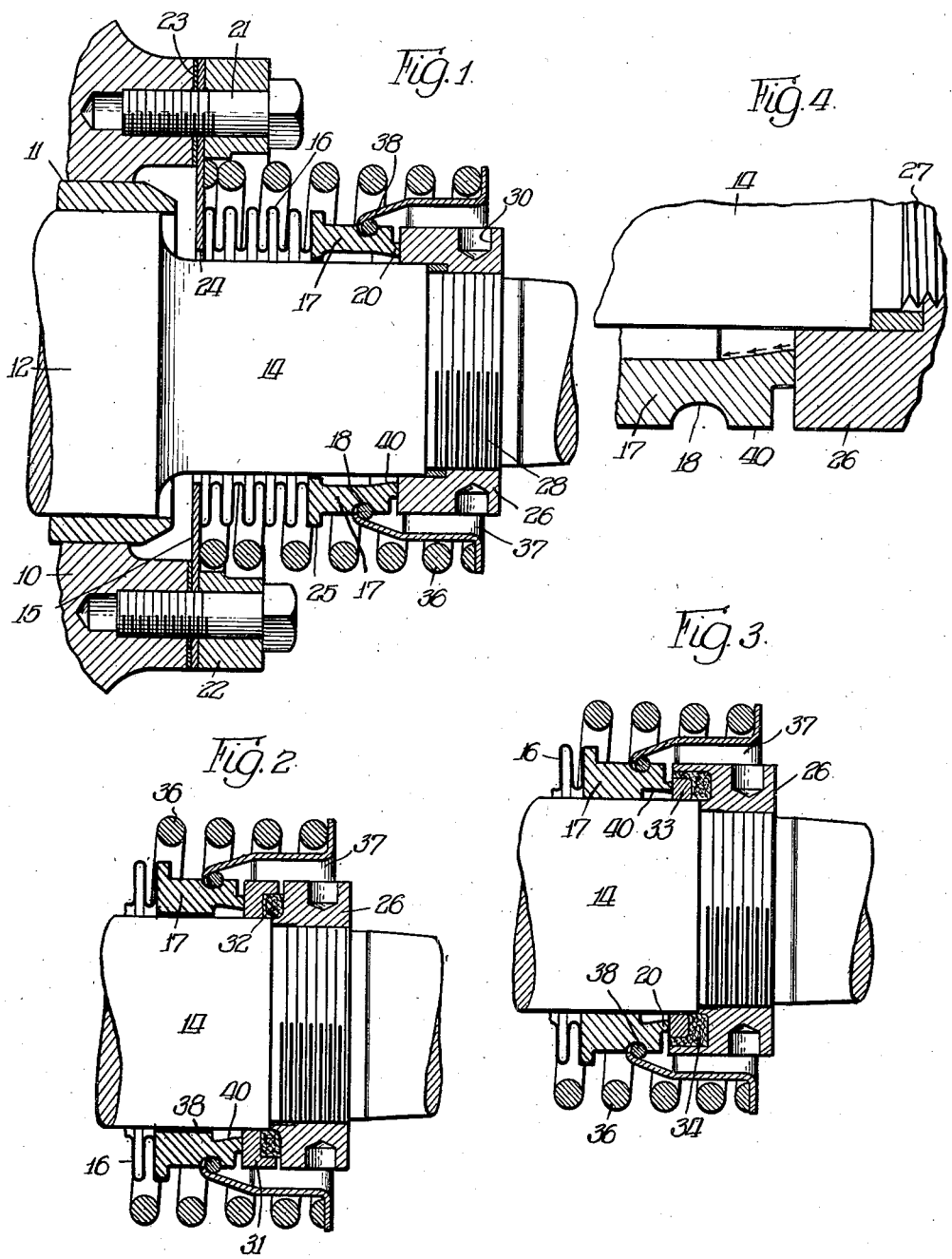
Inventor:
Fred R. Erbach, Patented Nov. 5, 1940

2,220,814

UNITED STATES PATENT OFFICE 2,220,814

SEALING DEVICE FOR ROTATING SHAFTS

Fred R. Erbach, Beloit, Wis., assignor to General Refrigeration Corporation, Beloit, Wis., a corporation of Delaware Application November 8, 1937, Serial No. 173,397

3 Claims. (Cl. 286—11)

The invention relates to seals for rotating shafts and has particular reference to seals for compressor shafts such as used in refrigerating systems.

The present sealing means consists essentially of a bellows assembly and a resilient coil spring for maintaining one end of the bellows assembly against its seat which forms a seal for the rotating shaft. It is an object of the present invention to provide a sealing device wherein the parts are arranged so that the seal is external and therefore visible for inspection and wherein the arrangement of the parts locates the resilient coil spring on the outside of the bellows, thus facilitating assembly of the sealing device since the coil spring can be applied as the last step in the operation and without stretching the bellows.

A further object of the invention is to provide an arrangement of parts forming a sealing device which will result in more equal loading of the seal face. This result is secured principally through the use of a long coil spring and which applies force at a point beyond the seal face, such an application of pressure producing more nearly a state of stable equilibrium. In the present device the spring is longer than the overall length of the seal face and bellows assembly, thereby securing maximum flexibility and reducing to a minimum the force tending to throw the seal ring out of square.

Another object of the invention resides in the provision of an improved sealing device which will prevent small particles and other foreign substances in the oil from accumulating between the surfaces forming the seal face. Thus, the present structure will have a longer life with increased efficiency in operation.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a vertical sectional view illustrating the arrangement of the several parts comprising the sealing device of the present invention;

Figure 2 is a fragmentary sectional view illustrating a modified construction of rotating sealing nut;

Figure 3 is a fragmentary sectional view illustrating another modification of rotating sealing nut; and Figure 4 is a fragmentary sectional view showing the improved structure for preventing the accumulation of small particles in the oil between the sealing surfaces.

Referring to the drawing, particularly Figure 1, the numeral 10 represents the casing of a compressor or the like having a bearing 11 for the rotating shaft 12 provided with the reduced portion 14 which projects outwardly from the casing and connects with a source of power by which the compressor is driven. In compressors, particularly those used in refrigeration, the crank case provides storage space for the gaseous refrigerant and it is therefore necessary to seal the projecting end of the rotating shaft with respect to the compressor to prevent leakage of gas along said shaft.

The sealing device of the present invention essentially consists of a bellows assembly including a plate washer 15, an axially expansible member or bellows 16, preferably formed of thin sheet metal, and a collar 17 having an exterior groove 18 formed in its outside surface and having an annular projection 20 extending from the front face of said collar. The plate washer 15 is fixedly secured to the compressor 10 by means of the bolts 21 and ring 22, there being interposed between the compressor and said plate washer, the gasket 23, which assures a gas-tight connection. The bellows is secured at one end, as at 24, to said plate washer, and at its other end at 25, the bellows is secured also in a gas-tight manner to the collar 17. The bellows assembly encircles the portion 14 of the rotating shaft but said assembly does not rotate therewith since the plate washer is fixedly secured to the compressor.

The only rotating part of the present sealing device is the nut 26 which is provided with internal threads 27 for threaded engagement with portion 28 of the rotating shaft 12. Recesses 30 are located around the exterior of the nut 26 for receiving a tool or the like by which said nut can be screwed up tight onto said shaft. Said recesses also facilitate the operation of unscrewing the nut in case it is desired to remove the sealing device for repair or other reasons.

Since the collar 17 is non-rotatable, whereas nut 26 has rotation with the shaft, the actual seal of the present device is formed by the contacting surfaces of these parts. As shown in Figure 1 the annular projection 20 extending from the collar 17 has engagement with the face of the nut 26, forming a seal therewith. In the modification shown in Figure 2 a washer 31 is interposed between the collar and the nut, said washer having an insert 32 of relatively soft metal or packing which has engagement with the nut 26.

In the modification shown in Figure 3 the nut 26 is provided with a bearing surface formed by the ring 33, which has engagement with projection 20 of collar 17. The ring 33 is in effect an insert with respect to the nut 26, there being interposed between the parts a relatively soft metal or packing 34. The advantage in this modification lies in the fact that ring 33 takes all the wear due to the rotation of the nut 26 and for repairing the same it is only necessary to remove the worn ring and insert a new one in its place.

For yieldingly holding the coacting faces of the collar and nut in engagement the invention provides resilient means in the form of a coil spring 36, which spring is exteriorly located with respect to the nut, collar and bellows, being disposed substantially concentric as regards these parts and having support at its inner end on the plate washer 15. The coil spring 36 applies pressure to the collar 17 through the instrumentality of a spring retaining member or cup 37. The coil spring is thus confined between the plate washer and said cup which is releasably secured to the collar 17 by means of the snap ring 38. The snap ring forms a ball and socket joint with the cup 37 and thus the force exerted by the spring is more uniformly transmitted to the collar 17 and evenly distributed around the annular projection 20 of said collar which has contact with the coacting face of the nut 26.

It is of course necessary to keep the coacting faces forming the seal of the present device well lubricated and for this reason a lubricant is retained within the space formed by the bellows assembly. In order to prevent the small particles and other foreign substances in the oil from accumulating between the surfaces forming the seal the interior of the collar 17 at its forward end thereof is formed with sloping surfaces 40. As clearly shown in Figure 4 the slope of said surfaces is such as to direct the small particles and other foreign substances away from the coacting surfaces forming the seal. In other words, the slope is away from the sealing face, which permits dirt particles and the like feeding across the seal face to be taken away from the seal and disposed of without destroying the surfaces. In order to accomplish the desired results an angle of two or three degrees is all that is necessary.

In assembling the present sealing device the bellows assembly is first positioned concentrically on the portion 14 of the shaft and the plate washer 15 is firmly secured in place on the compressor 10. The nut 26 is then threaded to the rotating shaft and as a last operation the coil spring 36 is applied which when secured to the collar by the snap ring 38 will apply a force to said collar, maintaining the sealing faces in contact. A desirable feature of the present construction resides in the fact that the parts can be assembled without undue stretching or extension of the bellows. Also the seal is external and therefore visible for inspection. By using a relatively long coil spring, which when under compression has a length equal to the bellows 16, collar 17 and nut 26, maximum flexibility is secured and the forces tending to throw the seal ring out of square are reduced to a minimum. This latter effect is partly due to the fact that the present coil spring applies its force to the collar at a point beyond the sealing faces. Such an application of pressure produces more nearly a state of stable equilibrium.

The arrangement also results in the majority of the parts remaining stationary. This reduces to a minimum the vibration in the rotation of unbalanced seal parts. The present device is very easily and quickly assembled, the surfaces forming the seal are visible for inspection, and said surfaces are protected by the cup or spring retaining member which also covers the nut, the only rotating part of the seal.

What is claimed is:

1. A seal for the rotating shafts of compressors and the like, comprising a bellows member surrounding said shaft and having its inner end hermetically sealed to the compressor casing, a collar encircling said shaft and hermetically sealed to the other end of said member, said collar having an annular projection extending from the face thereof, a nut threaded to said shaft and engaging the annular projection of the collar to form a seal therewith, an exterior coil spring having encircling relation with the member, collar and threaded nut, an annular retaining member providing a seat for the outer end of said coil spring, and a snap ring held by said retaining member and having releasable engagement with the collar for connecting said retaining member to said collar, said connection being non-rigid and permitting movement of the retaining means with respect to the collar whereby the pressure applied by said collar to the rotating nut will be uniformly distributed throughout the extent of the seal face.

2. A seal for the rotating shaft of compressors and the like, comprising an axially expansible member surrounding said shaft, said compressor having one end of said member secured thereto in a gas-tight manner, a collar encircling said shaft, said collar being hermetically sealed to the other end of said member, means fixed to the shaft and engaging said collar to form a seal therewith, and an exterior coil spring having encircling relation with said member and collar for maintaining the collar in engagement with said means, the interior face of said collar adjacent the seal sloping outwardly in a direction away from the seal face to prevent the accumulation of particles at said seal face.

3. A seal for the rotating shafts of compressors and the like, comprising a bellows assembly having one end fixed to the casing of the compressor in encircling relation with the rotating shaft thereof and including a collar surrounding the shaft and forming the other end of the assembly, a nut threaded to the rotating shaft and engaging the collar to form a seal therewith, an exterior coil spring having encircling relation with the bellows, collar and threaded nut, an annular retaining member substantially concentric with said threaded nut and having a restricted diameter at its inner end and providing a seat for the coil spring at its outer end, a snap ring having releasable engagement with the collar, the restricted inner end of the retaining member being held by the snap ring in a manner to form a non-rigid connection between the retaining member and the collar, said coil spring having an over-all length greater than that of the bellows assembly including the collar, and the seat for said coil spring provided by the retaining member being located beyond the seal face whereby the coil spring provides maximum flexibility for yieldingly maintaining the coacting surfaces comprising the seal in contact.

FRED R. ERBACH.